United States Patent [19]

Park et al.

[11] 4,187,185

[45] Feb. 5, 1980

[54] OIL RECOVERY PROCESS USING OXYALKYLATED ADDITIVES

[75] Inventors: Jack H. Park; Walter D. Hunter, both of Houston, Tex.

[73] Assignee: Texaco Development Corporation, White Plains, N.Y.

[21] Appl. No.: 877,152

[22] Filed: Feb. 13, 1978

[51] Int. Cl.² ............................ E21B 43/24; E21B 43/22; C11D 3/34
[52] U.S. Cl. ........................... 252/8.55 D; 166/272; 166/275; 252/352; 252/355; 546/171
[58] Field of Search ................ 252/8.55 D, 355, 352; 166/272, 274, 275; 546/171

[56] References Cited

U.S. PATENT DOCUMENTS

| | | | |
|---|---|---|---|
| 3,731,741 | 5/1973 | Palmer et al. | 166/272 |
| 3,827,497 | 8/1974 | Dycus et al. | 166/275 X |
| 4,043,922 | 8/1977 | Palmer et al. | 252/8.55 |
| 4,044,831 | 8/1977 | Allen | 252/8.55 X |
| 4,071,458 | 1/1978 | Allen | 252/8.55 |
| 4,074,759 | 2/1978 | Bousaid | 252/8.55 X |

*Primary Examiner*—Herbert B. Guynn
*Attorney, Agent, or Firm*—Carl G. Ries; Thomas H. Whaley; Walter D. Hunter

[57] ABSTRACT

A process for recovering hydrocarbons from a subterranean hydrocarbon-bearing formation by injecting into the formation via an injection well an aqueous alkaline flooding medium such as water, steam, etc. containing a small amount of a sulfonated, oxyalkylated interfacial tension reducer, forcing the said flooding medium through the formation and recovering hydrocarbons via a production well.

9 Claims, No Drawings

OIL RECOVERY PROCESS USING OXYALKYLATED ADDITIVES

BACKGROUND OF THE INVENTION

1. Field of the Invention

This invention relates to an improved process for recovering hydrocarbons from a subterranean hydrocarbon-bearing formation penetrated by an injection well and a production well wherein an aqueous alkaline fluid such as water having dissolved therein a small amount of a sulfonated interfacial tension reducer is utilized to displace hydrocarbons in the formation toward a production well.

2. Description of the Prior Art

The production of petroleum products is usually accomplished by drilling into a hydrocarbon-bearing formation and utilizing one of the well known recovery methods for the recovery of the hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, waterflooding and steam processing may still leave up to 70-80 percent of the original hydrocarbons in place.

Thus, many large reserves of petroleum fluids from which only small recoveries have been realized by present commercial recovery methods, are yet to reach a potential recovery approaching their estimated oil-in-place.

Waterflooding is one of the more widely practiced secondary recovery methods. A successful waterflood may result in recovery of 30-50 percent of the original hydrocarbons left in place. However, generally the application of waterflooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery by this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes.

Consequently, process modifications have been developed which may incorporate additives to lessen the above cited disadvantages and thereby improve the efficiency of these processes. For example, surface-active agents and miscible liquids are utilized to decrease the interfacial tension between the water and the reservoir curde, and thickeners have been developed to adjust viscosity so as to inhibit fingering.

The practiced methods for the injection of additives commonly consist of injection of a slug of additive, contained in a transporting medium, e.g. water, into the formation and then following this injection with a flood water to move the additive slug through the formation. In its ideal effect, the so-called slug moves through the formation as an additive bank, thereby imparting its beneficiating effects to the recovery process.

In many hydrocarbon-bearing formations it is common to find the oil sands to be preferentially wetted by oil. It is well known in the art to inject into these preferentially oil-wetted formations certain chemicals to reverse the wettability characteristics of the formation, thereby increasing the effectiveness of a waterflood to remove the residual crude. For example, a dilute alkaline aqueous solution is known to increase the wetting characteristics of sand surfaces, and promote a leaching action and emulsification of the tarry materials. Those solutions have been used as slugs in conjunction with subsequent steam injection processes to force the emulsion thus formed through the formation to a production well.

Improved recoveries from heavy crudes or tar sands have been realized also by the use of dilute aqueous alkaline solutions containing an effective amount of non-ionic surfactant, whereby extraction is effected by the spontaneous emulsification when the aqueous liquid comes in contact with the tar in the sand.

However, some of the disadvantages of those additive recovery processes include the problem that the additive may be strongly adsorbed in the surfaces of the sand formation, resulting in a large or excessive amount of additive being required. The costs involved of these additives, which may be relatively expensive, may become excessive early in the life of the recovery process necessitating its termination. Other disadvantages include the unfavorable viscosity ratio between the flooding medium and the crude.

It is known that the recovery of oil by injection of water or other fluids varies substantially from one formation to another and it is believed that the asphalt content of the hydrocarbons of some formations is at least a major factor responsible for this variation. A variety of known asphalt dispersants have been employed in flooding media on the theory that such materials would substantially improve hydrocarbon recovery in those instances where asphalt was present in the native hydrocarbon, however, the use of such materials has not been particularly effective, probably because of the limited solubility of such agents in the normally employed flooding fluids. There is a definite need in the art, therefore, for a recovery process employing asphalt dispersants with improved solubility characteristics.

One of the principal objects of this invention is to provide an improved process for increasing the ultimate recovery of hydrocarbon from a hydrocarbon-bearing formation.

Another object of this invention is to provide an efficient method for the recovery of hydrocarbon from a hydrocarbon-bearing formation in which an aqueous alkaline flooding medium containing as an interfacial tension reducer a water-soluble, sulfonated, oxyalkylated, nitrogen-containing aromatic compound is utilized.

BRIEF SUMMARY OF THE INVENTION

This invention relates to a process for recovering hydrocarbons from a subterranean hydrocarbon-bearing formation penetrated by an injection well and a production well which comprises:

(a) injecting into the formation via an injection well an aqueous alkaline driving fluid having dissolved therein a small amount of a sulfonated interfacial tension reducer, (b) forcing the fluid through the formation, and (c) recovering hydrocarbons through the production well.

In another embodiment of this invention the formation is preheated prior to step (a) by injecting steam such as wet steam, saturated steam or superheated steam via the injection well into the formation.

DETAILED DESCRIPTION OF THE INVENTION

The aqueous alkaline flooding medium employed in the process of this invention comprises an aqueous drive fluid which can be, for example, steam, hot water, a mixture of hot water and steam or cold water together with an alkaline agent and a sulfonated interfacial tension reducer. Useful alkaline agents include compounds selected from the group consisting of an alkali metal hydroxide, alkali metal hypochlorites, an alkaline earth metal hydroxide and a basic salt of the alkali metal or alkaline earth metal which is capable of hydrolyzing in an aqueous medium to give an alkaline solution, the concentration of the alkaline agent being about 0.001 to about 0.5 molar to give the required alkaline solution. Examples of the especially useful alkaline agents include sodium hydroxide, potassium hydroxide, lithium hydroxide, ammonium hydroxide, sodium hypochlorite, potassium hypochlorite, sodium carbonate and potassium carbonate, etc.

Interfacial tension reducers which are highly useful in the process of the invention include sulfonated compounds of the formula:

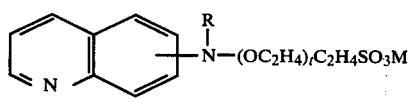

(I)

wherein t is an integer of from 3 to about 40, M is selected from the group consisting of hydrogen, sodium, potassium and ammonium and R is selected from the group consisting of hydrogen and —(OC$_2$H$_4$)$_s$C$_2$H$_4$SO$_3$M, where s is an integer of from 3 to about 40 and M has the same meaning as previously described.

Interfacial tension reducers of this type can be formed by first reaching an aminoquinoline such as 5-aminoquinoline, 6-aminoquinoline, etc. with ethylene oxide in the presence of a catalyst such as sodium hydroxide to form the corresponding ethoxylated aminoquinoline (II) which in turn is reacted with chlorosulfonic acid, for example, to yield the sulfated ethoxylated aminoquinoline (III). Reaction of Compounds III with sodium hydroxyethane sulfonate in the presence of sodium hydroxide as described by Hollander in U.S. Pat. No. 2,535,678 gives the desired sulfonated ethoxylated quinoline (Compound I).

The interfacial tension reducer should be present in the aqueous solution in sufficient concentration to effect the emulsification of the hydrocarbon material and maintain them in this sate during passage through the formation. Concentrations of the aqueous solution of from about 0.05 to about 5.0 percent by weight of the interfacial tension reducer are usually sufficient, although smaller or larger amounts may be employed satisfactorily in some cases.

The advantageous results achieved with the aqueous alkaline flooding medium used in the process of this invention are believed to be derived from the wettability improving characteristics of the alkaline agent and the oil releasing action of the interfacial tension reducer. The interfacial tension reducer is believed to be effective in releasing the crude from the pore surfaces or the sand surfaces as the case may be so that the surfaces can be exposed to the alkaline agent.

A further advantage of the aqueous alkaline flooding medium of this invention is believed to result from its ability to emulsify the extracted crude to form an oil in water emulsion. The effectiveness of the flooding medium is also thought to result to a great extent from its action on the heavier complex hydrocarbon materials referred to as asphaltenes present to some extent in all crudes and especially in low-gravity viscous crudes and oils such as those found in tar sands which are extremely difficult to recover. It has been shown that asphaltene fractions are responsible in a large part for the adhesive force which many oils and especially heavy crudes and tars have for the mineral surfaces of the hydrocarbon-bearing formations.

In operating the process of this invention one embodiment may consist of drilling an injection well into the formation through which the aqueous flooding medium is injected into the formation. The flooding medium may be injected continuously or a slug of the aqueous alkaline flooding medium containing the interfacial tension reducer may be injected into the formation followed by injection of a slug of an aqueous drive fluid such as water, hot water, or steam.

During the passage of the aqueous alkaline flooding medium of this invention which contains the interfacial tension reducer hydrocarbons are stripped from the formation, forming an oil-in-water emulsion which can then be produced at neighboring wells. Recovery of the hydrocarbons from the emulsion can be accomplished by any one of several well known emulsion breaking techniques.

The present invention will be more fully understood by reference to the following description of one embodiment thereof which is to be considered not limitative.

EXAMPLE

An oil formation is nearing the end of waterflooding, the formation being located at a depth of 8730 feet to 8763 feet. Consideration is being given to application of an enhanced recovery process involving flooding with an aqueous solution of an interfacial tension reducer. The average oil saturation after waterflooding is 38 percent. The porosity of the formation is 39 percent and the permeability is 85 millidarcies. The formation water salinity is 9000 parts per million total dissolved solids including 1300 parts per million hardness (calcium and magnesium). The temperature of the formation is 168° F. (75.6° C.).

The field has been developed using an inverted five spot patterns and only a single pattern is treated herein. Each pattern unit is square, 275 feet on a side, with an injection well in the center and production wells on each corner of the square. Since an inverted five spot achieves about 75% sweep efficiency, the pore volume of each pattern unit is:

$(275)^2(0.75)(32)(0.38) = 689,700$ cubic feet.

The interfacial tension reducer chosen for use in this application has the formula:

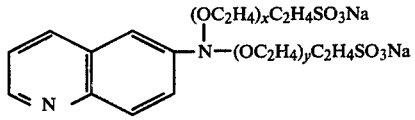

wherein the average sum of x and y is about 12.

A 20 pore volume percent of oil recovery fluid containing the interfacial tension reducer (137,940 cu. ft. or 1,030,930 gallons) is prepared. The first 10 percent or 103,193 gallons contains 2.5 percent by weight of the interfacial tension reducer, whereas the remaining volume contains 1.0 percent by weight. The higher concentration in the first fraction of fluid injected is employed to offset loss of the interfacial tension reducer from solution due mainly to adsorption. A total of 98,850 pounds of interfacial tension reducer (on a 100 percent active material basis) is required. The interfacial tension reducer is dissolved in the above described formation brine.

The oil recovery fluid is injected into the formation at a pressure well below the known fracture pressure of 3200 psi, which results in an average injection rate of 20 gallons per minute or 28,800 gallons per day. The time required for injection of oil recovery fluid is 35 days.

The oil recovery fluid is followed by a one million gallon slug of viscous mobility buffer fluid comprising relatively fresh water containing a copolymer of acrylate and acrylamide, the polymer concentration being 900 parts per million in the first half million gallons of the fluid and 500 parts per million in the second half of the volume of fluid.

The above described polymer fluid is displaced through the formation with brine until the water cut rises to a value above 90, signifying the end of this pilot. The average residual oil saturation is reduced to 11% by this enhanced recovery process.

What is claimed is:

1. A method for recovering hydrocarbons from an underground formation penetrated by an injection well and a production well which comprises:
   (a) injecting into the said formation via said injection well an aqueous drive fluid having dissolved therein about 0.05 to about 5.0 weight percent of a sulfonated interfacial tension reducer,
   (b) forcing the said fluid through the formation to displace hydrocarbons in said formation, and
   (c) recovering the displaced hydrocarbons via said production well, and wherein the said sulfonated interfacial tension reducer has the formula:

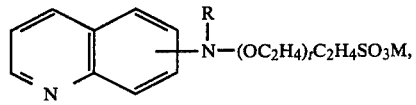

wherein t is an integer of from 3 to about 40, and M is selected from the group consisting of hydrogen, sodium, potassium and ammonium, R is selected from the group consisting of hydrogen and $-(OC_2H_4)_sC_2H_4SO_3M$, where s is an integer of from 3 to about 40 and M has the same meaning as previously described.

2. The method of claim 1 wherein the aqueous drive fluid is water.

3. The method of claim 1 wherein the aqueous drive fluid is steam.

4. The method of claim 1 wherein the said aqueous fluid contains an alkaline agent selected from the group consisting of sodium hydroxide and potassium hydroxide in about 0.001 to about 0.5 molar concentration.

5. The method of claim 1 wherein the aqueous fluid is saturated with carbon dioxide at injection pressure.

6. A fluid comprising water containing dissolved therein about 0.5 to about 5.0 weight percent of a sulfonated interfacial tension reducer having the formula:

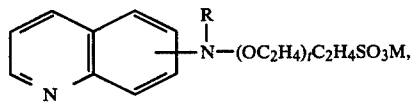

wherein t is an integer of from about 3 to about 40, M is selected from the group consisting of hydrogen, sodium, potassium, and ammonium, and R is selected from the group consisting of hydrogen and $-(OC_2H_4)_sC_2H_4SO_3M$ where s is an integer of from 3 to about 40 and M has the same meaning as previously described.

7. The fluid of claim 5 wherein the said interfacial tension reducer M is —Na.

8. The fluid of claim 6 which contains an alkaline agent selected from the group consisting of sodium hydroxide and potassium hydroxide in about 0.001 to 0.5 molar concentration.

9. The fluid of claim 6 saturated with carbon dioxide at pressure of about 300 to about 3000 psig.

* * * * *